(12) United States Patent
Ruttor et al.

(10) Patent No.: US 6,736,028 B2
(45) Date of Patent: May 18, 2004

(54) HARMONIC DRIVE AND INTERNAL GEARED WHEEL FOR A DRIVE OF THIS TYPE

(75) Inventors: Martin Ruttor, Ansbach (DE); Wilhelm Wolf, Petersaurach (DE)

(73) Assignee: Oechsler Aktiengesellschaft, Ansbach (DE)

( * ) Notice: Subject to any disclaimer, the term of this patent is extended or adjusted under 35 U.S.C. 154(b) by 0 days.

(21) Appl. No.: 10/220,826

(22) PCT Filed: Feb. 22, 2001

(86) PCT No.: PCT/EP01/02026
§ 371 (c)(1),
(2), (4) Date: Oct. 21, 2002

(87) PCT Pub. No.: WO01/66975
PCT Pub. Date: Sep. 13, 2001

(65) Prior Publication Data
US 2003/0089194 A1 May 15, 2003

(30) Foreign Application Priority Data
Mar. 4, 2000 (DE) .......................... 100 12 601

(51) Int. Cl.$^7$ .............................................. F16H 33/00
(52) U.S. Cl. .............................................. 74/640
(58) Field of Search .......................... 74/640

(56) References Cited

U.S. PATENT DOCUMENTS

| 3,200,668 | A | * | 8/1965 | Janes | 74/640 |
| 3,362,254 | A | * | 1/1968 | Lewis | 74/640 |
| 6,202,509 | B1 | * | 3/2001 | Dold | 74/640 |
| 2003/0047025 | A1 | * | 3/2003 | Ruttor | 74/640 |

FOREIGN PATENT DOCUMENTS

| DE | 19912761 A | 9/1999 |
| EP | 0974 773 A | 1/2000 |

* cited by examiner

Primary Examiner—Dirk Wright
(74) Attorney, Agent, or Firm—Horst M. Kasper

(57) ABSTRACT

The star-shaped internal geared wheel (15) of a harmonic drive (12) consists of individual tappets (21) which are displaceably interconnected by a retainer ring (28) which circles them at approximately half the height of the tappet shaft, so that they form a single part that can be handled. The inner front end (28) of the tappet shaft, which is thermally dimensionally stable, is provided with a guiding shoe or at least provided with a slide-resistant coating opposite a radially elastically compressible head (26). The internal geared wheel (15) is produced as a one-part plastic injection-moulded element in a multiple component method, with a thermally dimensionally stable foot (23), support ring arms (28) which are elastically moulded onto the respective dimensionally stable and extremely resistant tappet shaft and head walls (27,32) consisting of different plastics.

11 Claims, 2 Drawing Sheets

HARMONIC DRIVE AND INTERNAL GEARED WHEEL FOR A DRIVE OF THIS TYPE

The present invention relates to a harmonic drive and an internal geared wheel for such a drive according to the respective preambles of the main claims.

BACKGROUND OF THE INVENTION

The functionality of such a harmonic drive—also known as a wave drive or ring band drive—as a very strongly reducing, self-limiting system having a driven shaft coaxial to the drive shaft, is based on a rotating wave generator revolvingly radially deforming a hoop, also referred to as a flexible band, and therefore the external peripheral surface of this wheel rim revolvingly pressing locally outward against the hollow cylindrical internal peripheral surface of slightly greater circumference of a stationary, dimensionally stable bearing ring. As a consequence, the internal geared wheel itself or its wheel hoop, mounted thereon as a rotatable wheel rim, rolls in the bearing ring frictionally via friction surfaces or positively via teeth, the wheel and/or its hoop rotating slower than the drive core of the wave generator, which is driven by a motor, according to the difference in circumferences. This rotational movement, which is greatly slowed in relation to the actuation, is preferably transmitted via the external teeth of the wheel rim to the internal teeth of a further external ring, the driven ring, which is concentric to the bearing ring but not stationary, a further reduction of the rotational velocity able to occur due to differing circumferences (number of teeth). The wave generator is typically driven via a low voltage DC motor, coaxially flanged on, which is high-speed and therefore available very cheaply, whose rotation is thus reduced into a much greater torque corresponding to a much slower rotational movement.

In the embodiments of such a harmonic drive known from German Utility Model 2 96 14 738 and described in more detail in the article "Genial einfach" by H. Hirn (KEM Antriebstechnik issue November 1996), a non-round (for example triangular or preferably oval in axial cross-section) drive core is rotated concentrically in the hub of a radially deformable internal geared wheel as a wave generator. Dimensionally stable spokes between the hub, which is radially deformed by the drive core, and the hoop wheel rim of this internal geared wheel, which is also radially deformable and is externally toothed, have the effect that the external teeth of the hoop, corresponding to its revolving radial deformation, only engage over a limited curved segment, which rolls therein, with the inner teeth of the bearing ring. Instead of the internal geared wheel, made of hub, spokes, and externally toothed wheel rim, which rotates in relation to the stationary external bearing ring and in the opposite direction relative to the drive core, according to the utility model cited, individual mushroom-shaped or T-shaped tappets may be guided using their shafts in the channels of a stationary cage so they are radially displaceable in relation to the axis of the shaft generator. The revolving radial displacement of the rolling procedure in the bearing ring then occurs in that the feet of the tappets rest under elastic tension on the non-round external lateral surface of the drive core, which rotates in a coaxial central bore of the cage, driven by a motor. The flexible band, whose external teeth are again locally deformed outward revolvingly by the sequence of the tappets radially displaced outward, in order to thus roll in the bearing ring, runs as a wheel rim over the heads of the tappets, which are expanded in the peripheral or circumferential direction, i.e., tangentially.

In this way, in such a harmonic drive, the very high speed of an input shaft is converted into the, in contrast, very low speed of an output shaft, oriented coaxially to the input shaft, having correspondingly higher torque. To reduce the heat-generating friction between the pairing of the plastic lateral surfaces, of the drive core on the one hand and of the internal geared wheel hub or the sequence of tappet feet on the other hand, rotating relative to one another, in this prior publication, a friction bearing in the form of a metal collar is introduced, which also eccentrically deforms revolvingly under the influence of the eccentric drive core rotated therein. This interposed friction bearing distributes the relative rotation between the drive core and the internal geared wheel hub onto two stages and, merely due to the frictional behavior of plastic, which is generally more favorable than that of metal, also leads to reduction of the friction losses, i.e., the waste heat within this harmonic drive, which is compactly produced almost completely from plastic injection molded parts and is hermetically encapsulated. However, high demands are placed on the alternating stressability of the collar, which continuously deforms under load, and its installation in such a harmonic drive of small dimensions leads to a detectable elevation of the manufacturing costs, because the non-round drive core must be inserted into a metal collar, which is round per se, without play. Probably due to this significant disadvantage, in the refinement of the harmonic drive according to German Patent Application 1 97 33 497 A1—having a continuous sequence of circular ring sectors, which may be displaced radially relative to one another, instead of the tappets distanced from one another around the circumference—such a metal friction collar was again dispensed with and instead (column 2, line 11) importance is placed on the high elasticity of the internal geared wheel hub, in order to be capable of inserting the non-round drive core here as easily as possible during assembly. This is even more significant if (as shown in FIG. 6 of this prior publication), two convex surfaces having parallel axes, namely the external lateral surface of the drive core and the foot end of the respective internal geared wheel sector, are supported on one another, i.e., a load which is now almost only linear occurs, having correspondingly steeply increasing surface pressure. However, the additional heat to be expected due to the continuous frictional movement of the neighboring sectors against one another is also disadvantageous. The refinement then produced according to European Patent Application 0 974 773 A2 also gave cause to fear a significantly worsened thermal fatigue strength in this respect in the support of the internal geared wheel tappets, now again in the form of spokes, on the drive core of the wave generator, because the feet of the tappets, again distanced from one another but now connected to one another by a flexible ring band, are no longer solid, but split in order to produce a radial spring effect through elastic bending. It may therefore be seen that those skilled in the art no longer provide proper consideration to the thermal strain of the internal geared wheel by the wave generator.

The present invention is therefore based on the technical problem of being able to design the very strongly reducing plastic drive, which has proven itself per se, so it is even more functionally reliable and compact, through further reduction of the number of individual parts to be assembled, which are subject to wear, and nonetheless, precisely in consideration of the restricted volume, to further reduce the frictional development of waste heat, since it may be dissipated via the plastic parts only poorly.

The achievement of this object is based on the idea that in the drives in consideration here, compactly produced in plastic injection molding, the functionality of the radially deformable internal geared wheel—whether it is produced integrally or from individual parts—requires greatly differing, even contradictory material properties in radial section. This is because the rolling procedure on the drive core must, in spite of frictional heat, be dimensionally stable and have high fatigue strength; wheel spokes or tappet shafts which are elastically coupled but stiff per se are to be sought for the revolving radial power transmission, in order to be able to avoid the assembly costs and the frictional heat due to an additional cage or mutual lateral support of loose sector-shaped tappets according to the related art; and for the procedure of rolling of the hoop or flexible band in the bearing ring, a localized revolving radially elastic yielding nestling into the concave curves having the greater external radius is desirable here.

According to the present invention, the achievement of the object is provided in an intermediate form between the previously known one-piece internal geared wheel made of hub, spokes, and hoop, on one hand, and the separate tappets radially guided independently from one another in a cage, on the other hand, and above all in combination with a design of the tappet feet which has high fatigue strength under frictional heat. The individual tappets, arranged overall in a radial or star shape, are peripherally connected to one another parallel to the axis for attitude positioning—but no longer rigidly as spokes along a hub at their feet and along a hoop at their heads, but rather, with dimensionally stable support on the drive core of the shaft generator, approximately centrally by peripheral flexible arms extending on both sides to the tappets neighboring at a distance. At the same time, the tappets are each supported, using the feet ends of their shafts, approximately radially on the external lateral surface of the wave generator drive core so they are slip-proof (also so that they are thermally dimensionally stable and able to slide well), and they may have radially elastically compressible heads on the opposite ends, of which only those which immediately lie in the extension of one of the larger radii of the wave generator, and are therefore displaced somewhat outward from an imaginary circular arc, nestle snugly into the hollow cylindrical internal lateral surface of the external rings (bearing ring and driven ring), which neighbor one another axially. For form-fitting rolling, the external teeth of the internal geared wheel may be implemented directly on the external lateral surface of the peripheral sequence of tappet heads neighboring one another at a distance as an interrupted wheel rim, a separate flexible band having external teeth drawn coaxially over the tappet heads serving as a carrier.

The head of each tappet is elastically deformable well in the longitudinal direction of the shaft due to its geometrical shaping and/or due to its material selection. In contrast, the opposing foot end of the shaft of each tappet is, as already described, designed to have good fatigue strength under frictional heat, for which purpose it may have a slippery coating, applied by electroplating, for example, and/or may be tipped with a sliding block made of hard, heat-resistant material (which in turn may be covered on its free face with material which is resistant to friction in relation to the lateral surface of the drive core).

If the shaft of each tappet only has two short flexible arms transversely, which may end in connection profiles for articulating coupling to the peripherally neighboring arms of the tappets neighboring on both sides, then an internal geared wheel having a variable number of tappets may be grouped therefrom. However, the number of tappets is preferably fixed. The arms are then either implemented integrally with the tappet shafts neighboring on both sides, namely flexibly injected onto the shafts; or the arms are continuously connected to one another into a flexible holding ring made of plastic or spring steel, which may be, for example, be equipped with the individual tappets at positions constructively provided for this purpose.

In order to avoid assembly work, which is costly and subject to error, as much as possible, this radial or collar-shaped formation of spoke-shaped tappets, which are radially displaceable in relation to one another and are coupled elastically approximately in the middle, may, however, be implemented more expediently in one piece, namely in one single method step in multicomponent injection molding, in order to be able to take the requirements for the material properties, which are completely different in some regions, into account. The tappet collar is particularly produced in this way, in one injection molding procedure, having a foot resistant to high temperatures made of a material having very good sliding properties, having a high-strength, stiff shaft for radial power transmission outward, and having the highly elastic materials for the molded-on connection arms for mutual connection of the tappets, which are nonetheless as freely movable as possible in relation to one another, and for the radially compressible head, which also has good sliding properties. A part of these contradictory requirements may also be approximated by alternating wall thicknesses which are adjusted to one another, but this is unsatisfactory in consideration of constructive marginal conditions and leads to performance losses. Therefore, the tappet internal geared wheel according to this aspect of the present invention is produced in the multicomponent method in an injection molding process with regional use of differing material properties as a function of the construction. In this case, the solid material for the shafts of the tappets is particularly introduced first and then, while it remains in the mold, the more elastic material for the flexible regions is injected on. For this purpose, the connection between these differing materials may be implemented using form fit and through the adhesive properties of the thermoplastic materials to be joined together. In this way, the greatly differing constructive requirements on the enclosed component may be fulfilled in one production step by the use of the greatly differing materials and therefore at a favorable price. In addition to the production from multiple (preferably two) different thermoplastics, the use of inserts, which is proven per se in plastic manufacturing technology, made of, for example, thermally dimensionally stable materials, is particularly also possible for the feet ends of the tappet shafts in the framework of the present invention.

Reference is made, in regard to further characteristics and additional refinements of the present invention, to the following description of a preferred exemplary embodiment of the achievement of the object according to the present invention and to the subsequent claims as well as to both of our contemporary parallel applications having the same title.

DETAILED DESCRIPTION OF THE DRAWINGS

Figure 1:
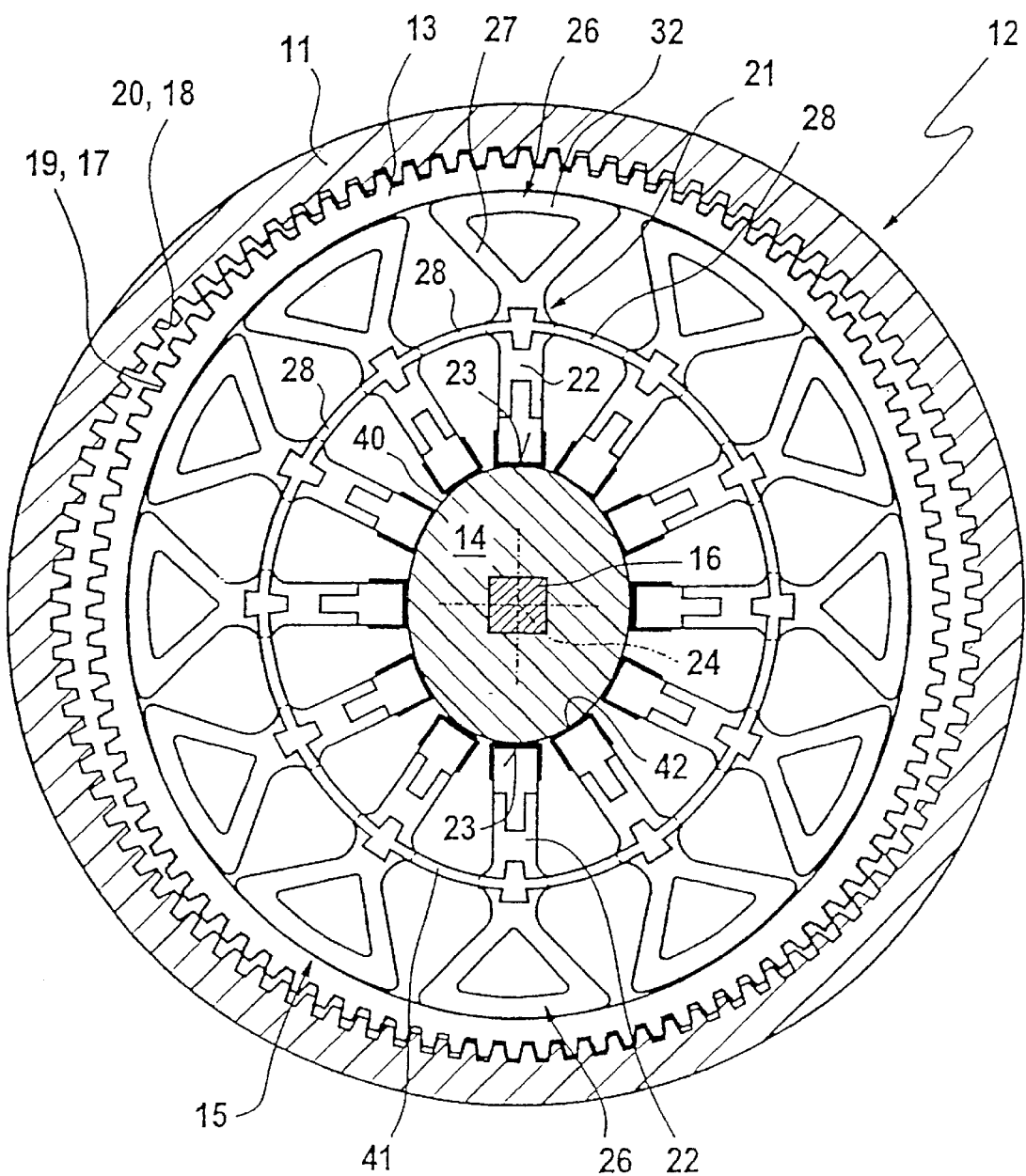
FIG. 1 shows a multicomponent tappet collar, installed into the bearing ring of a harmonic drive.

FIG. 1 of the drawing illustrates, approximately to scale and enlarged but restricted to the elements essential to its function and with the teeth sketched very roughly, a front view toward an internal geared wheel 15, designed according to the present invention, of a harmonic drive 12 inside its stationary bearing ring 11. In this example, internal geared wheel 15 is produced from a number of identical tappets 21, which are connected using a holding ring 41 into a collar handleable in one piece. Internal geared wheel 15 is penetrated coaxially by a dimensionally stable wave generator 14. A drive shaft 16, which is coaxial but rotates together with the internal geared wheel, engages in drive core 14, which is typically oval in cross-section as shown and is concentrically rotatable in relation to internal geared wheel 15; this drive shaft may be the directly extended motor shaft of a drive device (not visible in the illustration, but possibly positioned concentrically over the plane of the drawing as an electric or hydraulic motor).

Internal geared wheel 15, which is deformed to be non-round revolvingly in axial cross-section by wave generator 14, only brings a flexible band 13 into rotational connection with dimensionally stable, hollow-cylindrical internal lateral surface 18 of stationary external bearing ring 11 by friction or, as shown, form fitted via radial teeth 19/20, in the extension of the larger radii of wave generator 14 along curved segment 32 of its external lateral surface 17, which is displaced outward radially there sufficiently. Internal geared wheel 15, including wave generator 14, extends axially below the plane of the drawing into a further external ring, axially neighboring bearing ring 11 visible in the drawing, which is not arranged stationary, but is mounted by teeth 19 of internal geared wheel 15 so it also rotates as a coaxial driven ring of this strongly reducing drive 12.

This radially deformable internal geared wheel 15, which is axially long and radially wide, is assembled from a number of identical, individual tappets 21, which may be connected to one another radially so they lie next to one another and move together. Each of these approximately T-shaped tappets 21 comprises, above all, a cuboid shaft 22 extending approximately over the axial length of wave generator 14, which is supported, along the generating axis and radially in relation to device axis 24, using its foot 23 on external lateral surface 40, which is non-round in cross-section, of wave generator 14. Opposite the free face end of foot 23, each shaft 22 ends in a head 26, which is, above all, radially elastically compressible in relation to the shaft. The head essentially has the cross-sectional shape of a hollow cylindrical section, extending parallel to the axis over the length of drive core 14 and therefore over the length of shaft 22 parallel to the axis, having flexible transitions at the ends of its sectored side walls 27 opposite to foot 23 of shaft 22. These are elastically spread somewhat peripherally when a curved wall 32 of head 26 connecting this radial pair of walls 27-27 on the face side is somewhat radially compressed (namely flattened) against bearing ring 11 due to pressure, so that teeth 19/20 therefore engage somewhat more reliably here. A film-like wall 43, extending into the main plane of internal geared wheel 15 and therefore transverse to the direction of device axis 24, which more or less largely stretches over the free space of head 26 between walls 27-36-27, produces a constructively adjustable stiffening of head 26, which is basically radially elastic.

The lateral positioning of peripherally (i.e., around the circumference of internal geared wheel 15) neighboring tappets 21, which are in principle movable as freely as possible in relation to one another, in their lateral sequence, and therefore simultaneously their positioning, which is circular in the front view or collar-shaped in axial cross-section, and connection into one-piece internal geared wheel 15, is performed using short arms 28-28, preferably elastically molded laterally onto shaft 22 in one piece, whose sequence closes into a holding ring 41. Arms 28-28, which meet one another between two neighboring tappet shafts 22, may be connected to one another in an articulated way in order to group the initially loose interconnection of a large number of tappets 21, which are then linked to one another like a link chain, into internal geared wheel 15, which is deformable within limits in the axial cross-sectional plane. Its circumference may therefore be varied to a certain degree through the number of tappets 21 to be connected to one another into internal geared wheel 15 to adjust to the diameter of internal lateral surface 18 of a selected bearing ruing 11. It does not matter that the external curves of tappet head 23 do not always lie on one of the curves concentric to internal lateral surface 18, since head 26 is pressed radially into internal lateral surface 18 in the region of toothed engagement 19–20, while its curved wall 32 deforms and the wheel rim (flexible band 13) is interposed, and therefore always produces good locking form fit 19/20.

Even simpler, and therefore also more favorably automatable in manufacturing, is an integral flexible connection, for example, between neighboring tappets 21 into internal geared wheel 15 made of tappets 21 and holding ring 41. For this purpose, each tappet 21 is equipped with an arm 28 connected directly to the respective neighboring tappet 21. As is obvious from FIG. 1, however, tappets 21 may also be connected to one another by an elastic ring 41 made of plastic or spring steel instead of by molded-on arms. Individual tappets 21 are expediently alternately placed in first one axial direction and then the opposite axial direction in a frictional and form-fitting way on peripherally connecting holding ring 41, as is obvious from FIG. 1.

Opposite elastic head 26, each tappet 21 is equipped with a foot 23, also dimensionally stable under the effect of heat, which is preferably cast from particularly heat-resistant material onto the radial inner face end of shaft 22 with form-fitting dovetail, tongue and groove, or similar profiling in multicomponent injection molding. In place of this or in addition to this, a wear-resistant coating 42, applied through electroplating, for example, may be provided for the inner face end of shaft 22 or of sprayed-on foot 23.

Figure 3:
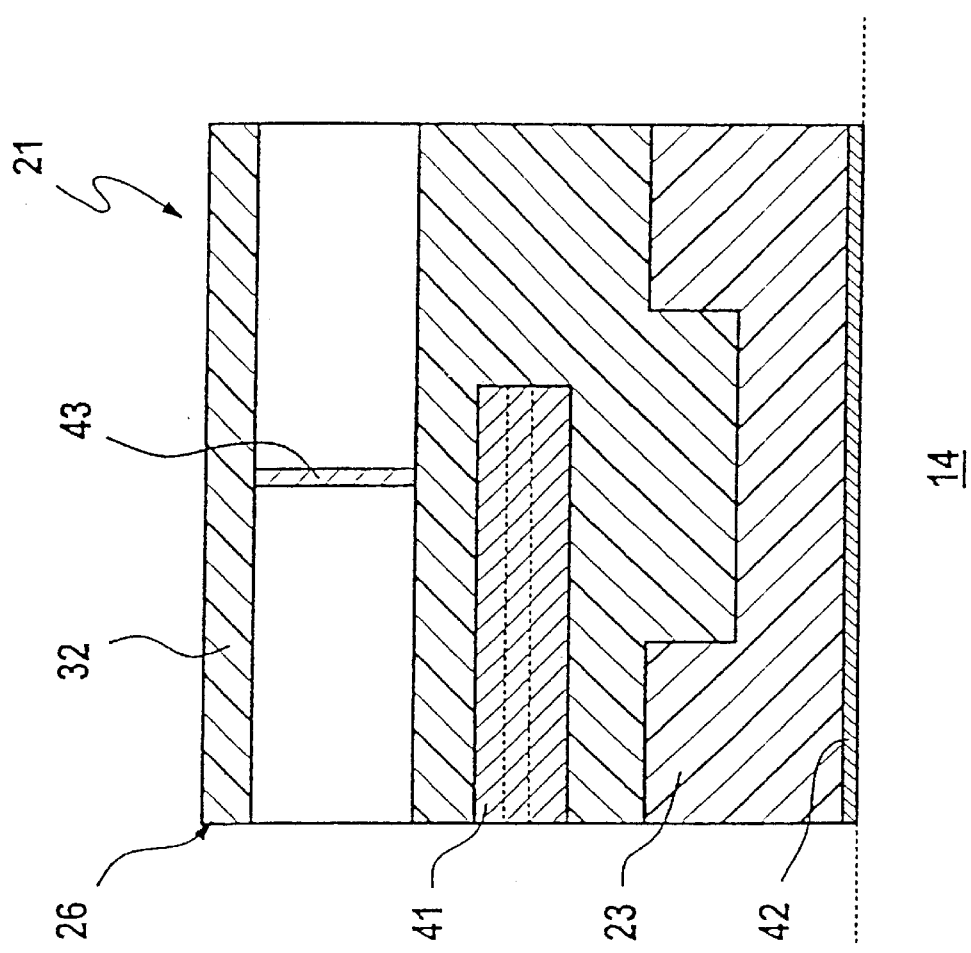
FIG. 3 shows the tappet shown in FIG. 2 in longitudinal section.
Figure 2:
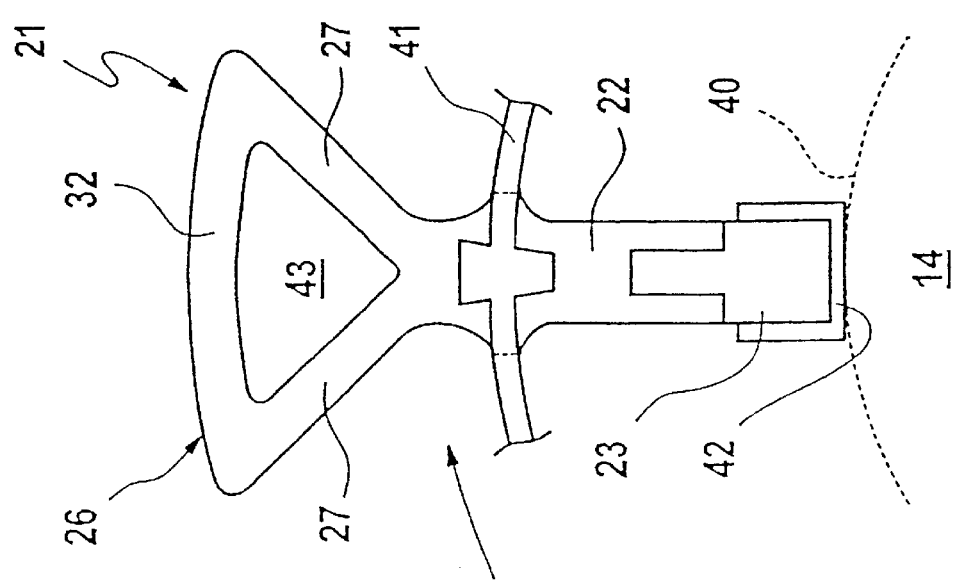
FIG. 2 shows a tappet in a front view as a detail from the tappet collar shown in FIG. 1.

The enlarged detail illustration shown in FIG. 2 again shows the construction of tappet 21 already described with reference to FIG. 1. The associated axial sectional illustration shown in FIG. 3 makes it obvious that holding ring 41, injected on from elastic plastic or made of spring steel strip, shaped for receiving individual tappets 21, does not have to extend over the entire axial length through shaft 22 of tappet 21. However, for torque compensation in the interest of quiet operation, it is expedient in this case to equip holding ring 41 with an even-numbered quantity of tappets 21 alternately from both sides of holding ring 41 in parallel to the axis.

In any case, star-shaped internal geared wheel 15 of a harmonic drive 21 comprises individual tappets 21 which are connected to one another, using a continuous holding ring 41 at about half the height of tappet shaft 22, so they are movable in relation to one another, into one single handleable part. Opposite a radially elastically compressible head 26, the inner face end of tappet shaft 22, which is laid out to be dimensionally stable under heat, is equipped with a sliding block (foot 23) or at least coated so it is resistant to friction. Internal geared wheel 15 is produced as a one-piece plastic injection molded part in a multicomponent method having foot 23, which is dimensionally stable under heat, and having holding ring arms 28, which are elastically molded onto respective dimensionally stable and high-strength tappet shaft 22, as well as head walls 27, 32 made of different thermoplastics.

What is claimed is:

1. A harmonic drive (12), having a non-round drive core which is rotatable around an axis (24) arranged therein as a wave generator (14), and an internal geared wheel (15), revolvingly radially deformable by tappets (21), having low-friction implementation of a radial support of the tappet (21) against the wave generator (14), characterized in that the tappets (21) are movably connected to one another peripherally via flexible arms (28-28) connected to their shafts (22), the tappets (21) are dimensionally stable under heat at the respective feet (23) of their shafts (22) and are tipped or coated to be low-friction in relation to the wave generator lateral surface (40), and the heads (26) have insides which have a film wall (43) stretched at least partially over them transverse to the device axis (24).

2. The harmonic drive according to claim 1, characterized in that the sequence of the arms (28) is laid out as a continuous holding ring (41) for the tappets (21).

3. The harmonic drive according to claim 1, characterized in that the tappets (21) each carry a radially and peripherally elastically deformable head (26) on the stiff, high-strength shafts (22), which is implemented as a hollow cylindrical sector parallel to the axis having side walls (27-27), flexibly adjoining the shaft (22), which are bridged by a curved wall (32).

4. The internal geared wheel according to claim 1, characterized in that the feet ends are tipped so they are low-friction.

5. The internal geared wheel according to claim 1, characterized in that the shafts (22) are equipped with slide feet (23).

6. The internal geared wheel according to claim 1, characterized in that the shafts (22) are flexibly equipped with peripherally oriented arms (28), which are connected to one another between two tappets (21—21) neighboring one another.

7. The internal geared wheel according to claim 6, characterized in that the arms (28) are connected to one another into a continuous holding ring (41) for the tappets (21).

8. The internal geared wheel according to claim 1, characterized in that the tappets (21) each carry a radially and peripherally elastically deformable head (26) on the stiff, high-strength shafts (22).

9. The internal geared wheel according to claim 8, characterized in that the head (26) is implemented as a hollow cylindrical sector parallel to the axis having side walls (27-27), flexibly adjoining the shaft (22), which are bridged by a curved wall (32).

10. The internal geared wheel according to claim 9, characterized in that the inside of the head (26) has a film wall (43) stretched at least partially over it transverse to the device axis (24).

11. The internal geared wheel according to claim 1, characterized in that it is produced in multicomponent injection molding in one piece from plastics having different strengths and elasticities.

\* \* \* \* \*